United States Patent
Eriksson et al.

(10) Patent No.: US 9,205,836 B2
(45) Date of Patent: Dec. 8, 2015

(54) METHOD AND SYSTEM FOR CONTROLLING A DRIVING DISTANCE

(75) Inventors: Anders Eriksson, Torslanda (SE); Johan Bjernetun, Mölnlycke (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/370,068

(22) PCT Filed: Jan. 2, 2012

(86) PCT No.: PCT/EP2012/000002
§ 371 (c)(1), (2), (4) Date: Aug. 13, 2014

(87) PCT Pub. No.: WO2013/102466
PCT Pub. Date: Jul. 11, 2013

(65) Prior Publication Data
US 2015/0012203 A1 Jan. 8, 2015

(51) Int. Cl.
*B60W 30/16* (2012.01)
*B60K 31/00* (2006.01)

(52) U.S. Cl.
CPC ............ *B60W 30/16* (2013.01); *B60K 31/0008* (2013.01); *B60K 2310/26* (2013.01);
(Continued)

(58) Field of Classification Search
CPC .................. B60W 2550/402; B60W 2720/106; B60W 30/16; G08G 1/166; G08G 1/167
USPC ......... 701/2, 96, 301; 180/170; 340/435, 903; 56/10.8; 244/17.19
See application file for complete search history.

(56) References Cited

U.S. PATENT DOCUMENTS 7,246,675 B2 * 7/2007 Lankes .................. B60K 31/00
180/170
(Continued)

FOREIGN PATENT DOCUMENTS

| DE | 44 18 085 A1 | 11/1994 |
|----|----|----|
| DE | 100 17 662 A1 | 10/2001 |
| DE | 10 2004 017115 A1 | 10/2005 |

OTHER PUBLICATIONS

International Search Report (Nov. 20, 2012) for corresponding International App. PCT/EP2012/000002.

*Primary Examiner* — James Trammell
*Assistant Examiner* — Sanjeev Malhotra
(74) *Attorney, Agent, or Firm* — WRB-IP LLP

(57) ABSTRACT

A method is provided for controlling a driving distance between a host vehicle and a first vehicle driving in front of the host vehicle, the host vehicle driving at a driving speed and at the driving distance to the first vehicle. The host vehicle includes a system for controlling the driving distance and a fuel saving system, wherein the system for controlling the driving distance is adapted to retain the driving distance at not less than a preset minimum safety distance, and wherein the fuel saving system includes an automatic speed increasing function which in case of fulfillment of a set of conditions automatically increases the driving speed in order to utilize kinetic energy inherent in the host vehicle to save fuel. The method includes retrieving information that the set of conditions is fulfilled such that the activation of the automatic speed increasing function is enabled, generating an altered safety distance by altering the preset safety distance by an offset distance, and if the driving distance is less than the altered safety distance, adapting the driving speed until the altered safety distance is reached, whereafter activation of the automatic speed increasing function is allowable, and, upon the activation, resetting the preset minimum safety distance such that the offset distance is available during the activity of the speed increasing function.

19 Claims, 2 Drawing Sheets

(52) U.S. Cl.
CPC ...... *B60K2310/264* (2013.01); *B60W 2520/10* (2013.01); *B60W 2550/143* (2013.01); *B60W 2550/308* (2013.01); *B60W 2550/402* (2013.01); *B60W 2720/10* (2013.01); *B60W 2750/308* (2013.01)

(56) References Cited

U.S. PATENT DOCUMENTS

| | | | | |
|---|---|---|---|---|
| 2006/0287828 | A1* | 12/2006 | Lehner | G08G 1/167 701/301 |
| 2007/0106475 | A1* | 5/2007 | Kondoh | B60K 26/021 701/301 |
| 2009/0093938 | A1* | 4/2009 | Isaji | B60W 10/184 701/96 |
| 2009/0198391 | A1* | 8/2009 | Kumar | B60L 3/12 701/2 |
| 2009/0299598 | A1* | 12/2009 | Boecker | B60W 30/16 701/96 |
| 2010/0253493 | A1* | 10/2010 | Szczerba | G01S 13/723 340/435 |
| 2011/0203243 | A1* | 8/2011 | Finkler | A01D 41/127 56/10.8 |
| 2012/0068007 | A1* | 3/2012 | Vialle | B64C 27/14 244/17.19 |
| 2013/0342368 | A1* | 12/2013 | Nathanson | G07C 5/008 340/903 |

* cited by examiner

METHOD AND SYSTEM FOR CONTROLLING A DRIVING DISTANCE

BACKGROUND AND SUMMARY

The present invention relates to a method for controlling a driving distance between a host vehicle and a first vehicle driving in front of said host vehicle, said host vehicle driving at a driving speed and at said driving distance to said first vehicle, said host vehicle comprising: a system for controlling said driving distance, which is adapted to retain said driving distance at not less than a minimum safety distance, and a fuel saving system, which includes an automatic speed increasing function, which automatic speed increasing function, upon fulfilment of a set of conditions, is activated to automatically increase the driving speed in order to utilise the kinetic energy inherent in said host vehicle to save fuel.

Fuel saving systems in general are known. In particular, fuel saving systems might define situations where a speed increase of the vehicle is suitable in order to save fuel by utilising the kinetic energy inherent in the vehicle. To determine where such situations will occur, the fuel saving systems may include systems in which the road ahead of a vehicle is surveyed in order to take information on the gradient of the road ahead into account, when operating the speed of the vehicle.

The gradient of the road may be taken into account using different conditions as set by the vehicle manufacturer. For example, one set of conditions may include the detection of a downhill route ahead of the vehicle, in which downhill the vehicle is allowed to increase speed beyond a set speed limit through i.a. freewheeling. Another set of conditions may instead include the detection of an upcoming uphill, where the vehicle is allowed to increase speed before reaching the climb. The vehicle consequently gains extra momentum at a position, on the road where such extra momentum is low-priced in terms of fuel economy. When reaching the climb the extra momentum is used to, at least to a certain extent, assist the vehicle to reach the top of the hill without too much effort and without losing too much speed during climbing.

Vehicles may also be provided with cruise control functionality which controls the speed of the vehicle and, more recently, optionally controls a minimum safety distance to a lead vehicle ahead of the vehicle in question. The safety distance may also be controlled by the aid of a system separated from the cruise control.

The industry strives continuously to reduce fuel consumption. It is desirable to further improve fuel consumption of vehicles provided with systems such as the ones described above, or to provide a useful alternative.

According to one aspect of the present invention, a method for controlling a driving distance between a host vehicle and a first vehicle driving in front of said host vehicle is disclosed, said host vehicle driving at a driving speed and at said driving distance to said first vehicle. Said host vehicle comprises:

a system for controlling said driving distance, which is adapted to retain said driving distance at not less than a minimum safety distance, and a fuel saving system, which includes an automatic speed increasing function, which automatic speed increasing function, upon fulfilment of a set of conditions, is activated to automatically increase the driving speed in order to utilise the kinetic energy inherent in said host vehicle (H) to save fuel.

The method comprises the steps of:

retrieving information to prepare for activation of said automatic speed increasing function, preparing for said activation by setting the minimum safety distance to a first distance, whereby, when said driving distance is less than said first distance, said system for controlling the driving distance will adapt said driving speed until said first safety distance is reached, allowing activation of the automatic speed increasing function only when, the driving distance is at least said first distance, and upon retrieval of information that said set of conditions is fulfilled, and, upon activation of said automatic speed increasing function, setting the minimum safety distance to a second distance, said second distance being shorter than the first distance, such that the difference between the second and the first distances is available during the activity of the speed increasing function to perform an automatic speed increase without conflict with the system for controlling a driving distance.

The inventive method is aiming at reducing fuel consumption for the vehicle. This is achieved by an improved cooperation between the fuel saving system and the system for controlling said driving distance. The two systems may otherwise obstruct one another, such that the system for controlling the driving distance counteracts the fuel saving system. For example, when a freewheeling function of the fuel saving system is launched in order to utilise the kinetic energy inherent in the vehicle, a pre-set minimum safety distance of the system for controlling driving distance between the host vehicle and a first or lead vehicle may be reached, and the vehicle, i.e. the host vehicle, is slowed down by the system for controlling driving distance. The slowdown may be achieved in several ways, such as utilising the vehicle brakes, disengaging the freewheeling function, or otherwise. Under such conditions the fuel saving prospect is reduced.

Instead, according to the present invention, the minimum safety distance used by the system for controlling driving distance is set to a first distance in preparation for activation of the speed increasing function. Moreover, the conditions are set that the driving distance must be at least said first distance, and information that the set of conditions for the automatic speed increase is fulfilled must be retrieved, in order for the automatic speed increase function to be activated (launched). Hence, the minimum safety distance used by the system for controlling driving distance will be set to a first distance before the automatic speed increasing function may be activated. Accordingly, before the automatic speed increasing function is activated, the vehicle is adapting its driving speed until the first distance to the first vehicle is reached.

When the first distance is reached, the automatic speed increasing function is allowed to be activated, and hence it may be activated if the set of conditions is fulfilled. The set of conditions could advantageously include conditions being obtained by automatic systems connected to the vehicle, but optionally one set of conditions could also include a decision of a user.

When the automatic speed increasing function is activated, the minimum safety distance is set to a second distance, being shorter than said first distance. In other words, the minimum safety distance is altered by the difference between the second distance and the first distance. This provides the vehicle with an adequate distance (said difference) to a first vehicle to make use of its automatic speed increasing function without conflict with the system for controlling driving distance. Thereby, fuel may be saved by utilising the inherent kinetic energy of the vehicle.

Advantageously, the second distance may be set so as to be satisfying in view of safety reasons, such that the host vehicle and the first vehicle are kept separated by an adequate driving distance. Hence, safety need not be compromised when using the fuel saving function.

A vehicle according to the present invention may be any one of a lorry or truck, a passenger car or bus, or any other vehicle for which such methods are appropriate. The words lorry and truck are meant both to represent a heavy-duty vehicle of any size and may be used interchangeably. The system for controlling said driving distance and the fuel saving system may be integrated into a single system if found appropriate. The distances as encompassed in the present invention may be calculated either as a distance in time or in length if nothing else is specified. A distance between two vehicles may be a distance from a front end of a host vehicle and a rear end of a first vehicle. However alternatives, such as front end to front end, may apply if found appropriate and depending on the systems for monitoring such distances present in the vehicles in question. The adaption of driving speed of the host vehicle may be achieved in several ways, such as by freewheeling, by reducing motor torque to the vehicle wheels, and by utilising vehicle brakes in combination with any energy retrieval functionality. It is however preferable if this adaptation is achieved in a fuel consumption beneficial way. The set of conditions to be fulfilled may include one or several conditions set by the vehicle manufacturer and include current speed and current speed limits, road curvature in both horizontal and vertical direction, and whether conditions influencing the road driveability.

In certain embodiments the fuel saving system may be a system whose function is selectable by a user. That is, the fuel saving system might not be running by default but a user-initiated activation must be performed for the fuel saving system to be active. In this case, preferably, a driver-initiated activation may be performed for activating the fuel saving system. In practice, this means that the driver could, for example by means of a dedicated button, select whether the fuel saving system shall be on or off.

In other embodiments, the fuel saving system may always be running by default.

In certain, embodiments, information to prepare for activation of the automatic speed increasing function is always available when the fuel saving system is active. Hence, whenever the fuel saving system is running, the preparation for said activation takes place by setting the minimum safety distance to a first distance, and by determining that the automatic speed increasing function may only be allowed if the driving distance is at least said first distance.

However, in preferred embodiments, the information to prepare for activation of the automatic speed increasing function is available only when the fuel saving system is active and said set of conditions of the automatic speed increasing function is about to be or is fulfilled. Accordingly, in this case the preparation for said activation will take place only when the system estimates that a situation where the automatic speed, increasing function shall be used is approaching. For example, in a vehicle surveying the curvature of the road ahead, the presence of a downhill slope ahead of the vehicle may indicate that the set of conditions is about to be fulfilled. Hence, when the downhill slope ahead of the vehicle is detected, the preparation for activation of the speed increasing function takes place, whereby the distance to the first vehicle will, be increased to the first distance. When the first distance is reached, and when the vehicle reaches the downhill slope, the automatic speed increasing function will be launched, and the minimum driving distance be set to the second distance, such that the difference distance may be used by the speed increasing function.

Advantageously, the system for controlling said driving distance includes a preset minimum safety distance, and the first distance may be set by adding an offset distance to the pre-set minimum safety distance.

In this case, the second distance may advantageously be equal to the pre-set minimum, safety distance, such that the offset distance is available during the activity of the speed increasing function.

This alternative has the advantage that the driver will recognise that the pre-set minimum safety distance is never shortened. In many systems, the pre-set minimum safety distance may be selected by the driver, hence reflecting his/her own requirements.

Alternatively, the system for controlling said driving distance includes a pre-set minimum safety distance, and the first distance equals to the pre-set minimum safety distance.

According to one embodiment the difference between said second distance and said first distance, in certain embodiments being the offset distance, is dependent on the driving speed. Hence the altered safety distance is also dependent on the driving speed.

Consequently, the safety level may be adapted depending on the driving speed, such as i.a. when driving at a lower speed the distance to a lead vehicle may be shorter by setting a shorter offset distance, although the safety level may still be kept at a reasonably high level.

According to one embodiment said host vehicle further comprises an active cruise control system, whereby the method further comprises:

driving at said driving speed under control by said active cruise control system.

According to one embodiment said host vehicle comprises freewheeling means whereby a propulsion unit may be disconnected from driving wheels of said host vehicle, wherein the step of activating said automatic speed increasing function includes launching of said freewheeling means.

According to one embodiment the step of retrieving information that said set of conditions is or is about to be fulfilled includes:

monitoring whether said set of conditions is fulfilled, and/or communicating information that said set of conditions is fulfilled.

Either the fuel saving system itself comprises monitoring functionality for monitoring the set of conditions, or the fulfilment of said set of conditions is communicated to it.

According to one embodiment the step of adapting said driving speed until said first distance is reached includes:

monitoring a topography of an intended drive ahead of the host vehicle, and selecting a position along said monitored intended drive for the step of adapting said driving speed until said altered safety distance is reached, in which position a favourable fuel consumption for the host vehicle is achieved for performing said step.

Hereby a monitored drive ahead of the vehicle may fulfil the set of conditions such that the automatic speed increasing function is allowable, but the activation thereof is postponed. The inventive method encompasses the selection of a position for activation of the automatic speed function for which favourable fuel consumption, i.e. possibly even more favourable fuel consumption, is achieved.

According to one embodiment the step of monitoring whether said set of conditions is fulfilled includes:

monitoring a topography of an intended drive ahead of the host, vehicle, and evaluating whether said intended drive includes an uphill slope which fulfils said set of conditions such that said automatic speed increasing function is enabled with the intention of increasing speed in advance of said uphill slope such that fuel may be saved during climbing thereof.

The climbing of an uphill slope may be fuel consumption intense, and the fuel consumption may be reduced if the inventive method is adapted to take such slopes into account when activating the automatic speed increasing function.

According to one embodiment the step of monitoring a topography of an intended drive ahead of the host vehicle includes using a Global Positioning System (GPS).

According to one embodiment the step of monitoring said set of conditions includes:
monitoring a topography of an intended drive ahead of the host vehicle by the aid of a Global Positioning System (GPS), and
calculating along said intended drive whether said set of conditions is fulfilled.

According to one embodiment the step adapting said driving speed until said first distance is reached and/or of monitoring whether said set of conditions is fulfilled includes:
assessing a near future behaviour of said first vehicle, preferably by estimating a weight/power ratio thereof.

By taking the near future behaviour of a first vehicle into account, or at least trying to take such behaviour into account, even more reduced fuel consumption may be achieved. By estimating e.g. a weight/power ratio of a first vehicle, it may be possible to predict, at least to a certain degree, its driving behaviour on the intended drive ahead such that the likelihood of a slowdown of the first vehicle. Other prediction measures may be contemplated, such as vehicle type, or driving style of the driver of the first vehicle.

According to one embodiment, the monitoring of a topography of an intended drive and/or the assessment of a near future behaviour of the first vehicle is used as input for selecting the difference between the second and the first distances, so as to adapt said difference to an estimated upcoming situation.

According to one embodiment the step of adapting said driving speed until said altered safety distance is reached includes automatically reducing power output to said driving wheels.

BRIEF DESCRIPTION OF THE DRAWINGS

The invention will now be described in more detail with reference to embodiments and the appended figures. In the figures

DETAILED DESCRIPTION

Figure 1A:
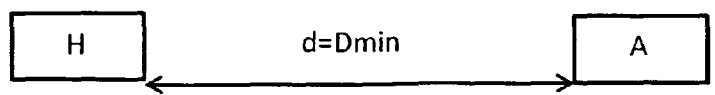
FIGS. 1a-1c, show a schematic representation of a host vehicle and a lead vehicle driving in accordance with an embodiment of a method according to the present invention.

The present disclosure relates to a method and a system for controlling a driving distance between a host vehicle H and a lead vehicle A driving in front of said host vehicle H. A lead vehicle A is one embodiment of a first vehicle A according to the claims. The lead vehicle A is the vehicle which is driving directly in front of the host vehicle H. The vehicles A and H both travel in a direction to the right, in FIGS. 1a-1c. The distance between the rear end of the lead vehicle A and the front end of the host vehicle H is called the driving distance d. Each vehicle is driving at its own driving speed, which driving speeds may be either manually set by the respective driver, or—controlled by a cruise control system present in the vehicles. The invention is not limited to a specific situation in this regard. The driving distance d may consequently either be constant, or continuously changing.

According to a preferred embodiment of the present invention the host vehicle H is provided with a cruise control system, a fuel saving system and a system for controlling said driving distance. All of these systems may be incorporated within one single general system, preferably the cruise control system. The cruise control system is however optional.

The system for controlling said driving distance of the host vehicle H is provided with a preset minimum safety distance Dmin, counted as a distance in either seconds or meters. If it is counted as a number of seconds, a typical preset minimum safety distance Dmin is 2 seconds. If and when the host vehicle H is catching up with the lead vehicle A, the system for controlling said driving distance of the host vehicle H is making sure that there always is at least a driving distance d which is longer than Dmin between the two vehicles.

The fuel saving system of the host vehicle H is provided with an automatic speed increasing function. This automatic speed increasing function may be either one or a combination of a free-rolling function and a pre-speed function. A free-rolling function allows the host vehicle H to increase speed by e.g. freewheeling through disconnection of the driving engine from the wheels, such that the internal friction of the host vehicle H is reduced. The energy lost in friction may instead to at least a certain extent be utilised as kinetic energy. Such freewheeling functionality may be included as a separate freewheeling unit, or may entail the use of means already present in a standard equipped vehicle, such as separating the wheels of the vehicle from the driveline through the clutch in the gear box. This may be performed in a downhill slope or under any other circumstances in which there is an opportunity to utilise the inherent kinetic energy of the vehicle to reduce fuel consumption. The pre-speed function allows the host vehicle H to increase speed in advance of e.g. an uphill slope, such that the host vehicle H is "loaded" with speed, or in other terms kinetic energy, which assists the vehicle to climb the slope. The speed is consequently gained at a position where the gain is achieved at a lower fuel cost than it would have been during climbing. Thereby the fuel consumption is lowered. It is not necessary according to the invention to increase speed in the pre-speed function in order to fully climb the uphill slope. Merely a small gain is sufficient. There may be other automatic speed increasing functions which falls within the scope of the claims.

The fuel saving system may be initiated by the driver of the host vehicle H when noticing an upcoming situation in which the automatic speed increasing function would be beneficial. This may be initiated i.a. through the depression of a dedicated button or the like. Alternatively, and more preferable, the fuel saving system may be provided with automated road monitoring functionality, such as a Global Positioning System (GPS), which monitors the road ahead of the host vehicle H, and which may determine and optionally communicate to the driver of the host vehicle when the fuel saving system is active or not.

Each automatic speed increasing function is accompanied by a set of conditions, the fulfilment of which allows the activation thereof. Each set of conditions comprise e.g. the distance to a slope, the gradient of the slope, i.e. whether it is a downhill or an uphill slope, and how steep it is, the length of the slope etc.

According to the present embodiment the GPS is constantly monitoring the road ahead of the host vehicle H. If a set of conditions is about to be fulfilled, preparation for activation of the corresponding automatic speed increasing function is performed.

In one example embodiment, the system for controlling the driving distance between the host vehicle and a first vehicle driving in front of the host vehicle includes a preset minimum safety distance Dmin. In the present example, the second distance is set to be equal to the preset minimum safety distance Dmin of the system for controlling a driving distance. Hence, the vehicles will never come closer to one another than preset minimum safety distance, even during the activity of the speed increasing function. To form the first distance, the preset minimum safety distance Dmi, is increased by a positive valued offset distance Δ, such that a first distance d^ which is longer than the initial preset minimum safety distance Dmin is created. The offset distance Δ is preferably counted in the same unit as the preset minimum safety distance Dmin. As an example, the offset distance Δ may be 1 second, resulting in a first safety distance of 3 seconds, when the preset minimum safety distance Dmin is counted in seconds and is preset to 2 seconds. Consequently:

$$d_!  = D\text{min} + \Delta \qquad (1)$$

Now, if the current driving distance d of the host vehicle H is less than the first safety distance d^ the current driving speed of the host vehicle H is altered by the system for controlling said driving distance, such that the current driving distance d is greater than, or at least equal to, the first safety distance di. Consequently:

$$d > d! \qquad (2)$$

In other words, the distance to the lead vehicle A is extended. Now the preparation is ready and the automatic speed increasing function may be activated, once the previewed set of conditions is actually fulfilled.

The activation of the speed increasing function may be done either by the driver manually after indication from the system that it is allowable, or preferably the system may automatically activate the function. The activation may further be accompanied by the necessity to fulfil one or several prerequisites before activation. This will be further explained below.

Upon activation of the automatic speed increasing function the safety distance is set to the second distance, which in this case means that it is reset to preset minimum safety distance Dmin, Consequently:

$$d \geq D\text{min} \qquad (3)$$

Hereby the host vehicle E is again allowed to come in closer to the lead vehicle A, but not closer than the preset minimum safety distance Dmin. This means that a distance span of d!−Dmin corresponding to the offset distance Δ is available for the host vehicle H to utilise the automatic speed increasing function, without being disrupted by the lead vehicle A by catching up upon it from behind. At least any such disruption should be limited to a minimum and to as few occasions as possible, leading to a choice of offset distance Δ which is adequately long, but simultaneously not too long to need too much time to reach before allowing the activation of the automatic speed increasing function.

Figure 1B:
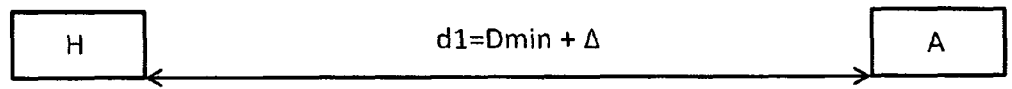
Figure 1C:
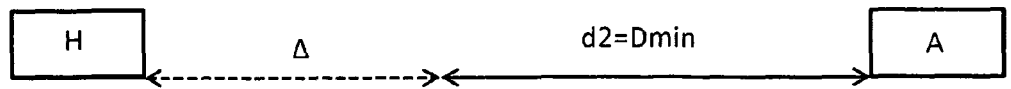

The situation where the host vehicle H is driving at a preset minimum safety distance Dmin behind a first vehicle A is illustrated in FIG. 1a. The driving distance d-Dmin, in this embodiment. Now, when information is retrieved that preparation shall be made for activating the automatic speed increasing function, it is prepared for this activation by setting the minimum safety distance to a first distance dv which in this case equals Dmin+offset distance Δ. This setting will cause the system for controlling the driving distance to act until the situation in FIG. 1b is attained, namely, the distance between the host vehicle H and the first vehicle A is indeed=Dmin+Δ. Now, the automatic speed increasing function may be allowed (if also information that the set of conditions is fulfilled may be retrieved). When the automatic speed increasing function is allowed, the minimum safety distance is set to a second distance d2, which in this case equals Dmin. This means that the offset distance Δ will be available during the activity of the speed increasing function, as indicated with a dotted line in FIG. 1c.

Figure 2:
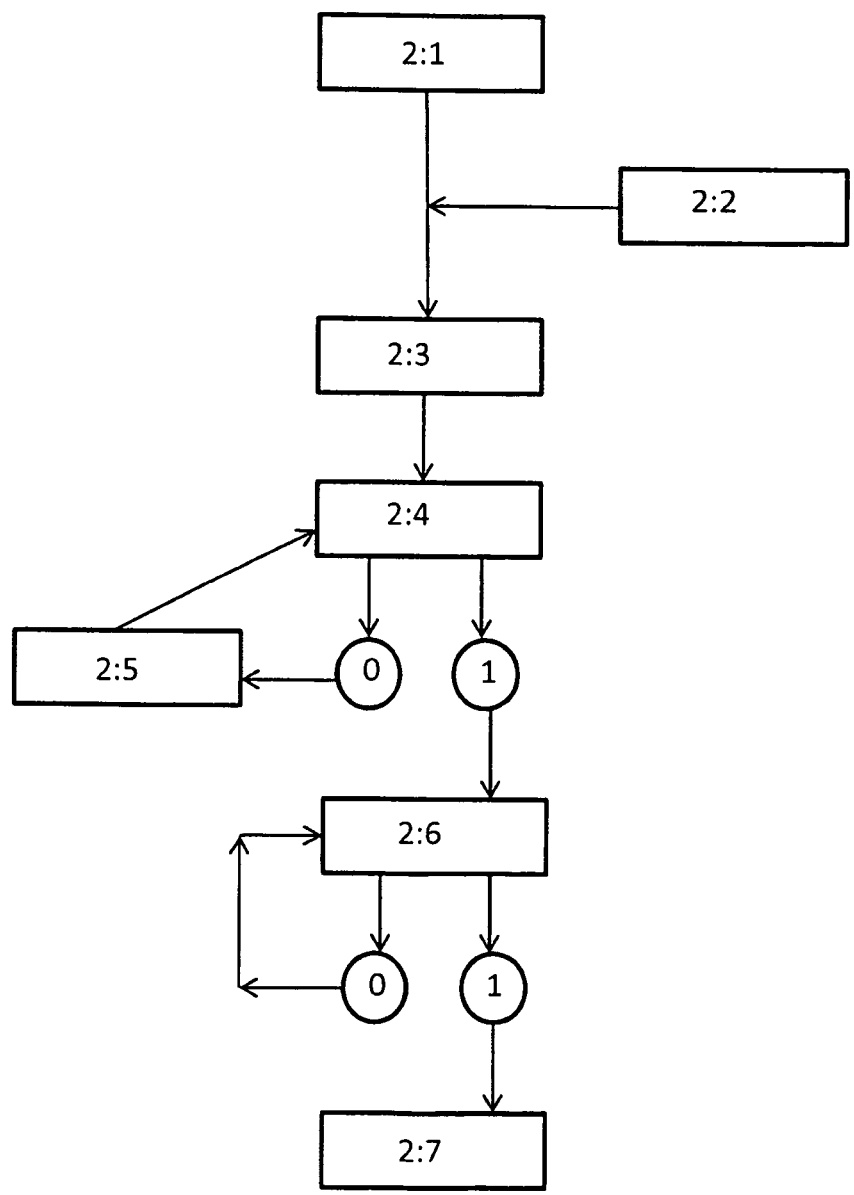
FIG. 2 is a flow chart of an embodiment of a method in accordance with the present invention.

FIG. 2 is a flow chart illustrating one embodiment of the invention.

The boxes of the flow chart correspond to the following:

2:1—A driving situation where the actual driving distance between host vehicle and first vehicle may be controlled by the system for controlling driving distance;

2:2—An incoming command to prepare for activation of the automatic speed increasing function;

2:3—Set the minimum safety distance d of the system for controlling driving distance to a first distance 2:4—Is the actual driving distance between host vehicle and first vehicle>=d1?

1 means yes, 0 means no;

2:5—Adapt the driving distance via the system for controlling driving distance;

2:6—Are the conditions for the automatic speed increasing function fulfilled? 1 means yes, 0 means no;

2:7—Set the minimum safety distance to a second distance d2 (being less than d and Activate the automatic speed increasing function.

In an alternative example embodiment, the first distance may correspond to the pre-set minimum distance Dmin. In such a case the second distance d2, being shorter than the first distance, will be shorter than the preset minimum safety distance Dmin. Accordingly, the host vehicle is allowed to come closer to a lead vehicle than the pre-set minimum safety distance. However, there is still a minimum distance to a lead vehicle A which does not allow the host vehicle H to come too close to the lead vehicle A, and still a distance span corresponding to the difference between the first distance and the second distance Δ is created within which the host vehicle H may utilise its inherent kinetic energy to save fuel. An advantage with the first distance corresponding to the pre-set minimum distance is that the inventive method may almost immediately allow the activation of the automatic speed increasing function after the generation of the altered safety distance $d_{altered}$ since the host vehicle H should already be driving at a driving distance d which is longer or equal to the preset minimum safety distance Dmin up until this point.

In other embodiments of the invention, the first and the second distances may be selected independently of any preset minimum safety distance Dmin of the driving distance control system.

It is noted that when the host vehicle H is provided with both a cruise control system and a fuel saving system, the automatic speed increasing function, may allow the vehicle H to increase speed beyond the maximum speed set by the cruise control system. It is possible to set a limit to how much this speed may increase beyond the set maximum speed in order to take both speed restrictions on the road and the perception of safety for the driver into account.

According to a preferred embodiment of the present invention the activation of the automatic speed increasing function is accompanied by a prerequisite which puts the activation on hold until the prerequisite is fulfilled. Such a prerequisite is that not only the set of conditions should be fulfilled in order to activate the automatic speed increasing function, but also that the monitoring of the intended drive ahead of the host vehicle H should note that the extent of the intended drive for which the set of conditions are fulfilled is longer than a preset distance. In this way, the automatic speed increasing function is used to its maximum potential. Another prerequisite may include the calculation, based on the monitored intended drive, of an optimum starting position for said activation, for which a maximum fuel consumption reduction is achieved.

Furthermore, the offset distance Δ, that is the difference between the first distance and the second distance, may not only be a fixed value, but a value depending on the driving speed of the host vehicle H. Consequently:

$$\Delta = A(\text{driving speed}) \quad (4)$$

Driving at a lower driving speed may allow a shorter driving distance to the lead vehicle A, or driving at a very high driving speed may necessitate an increased driving distance. This may be achieved by altering the offset distance Δ based on the driving speed.

To further improve the inventive method and system, it is preferable if the lead vehicle A could be monitored and its upcoming driving behaviour could be estimated or assessed. One way is to estimate the weight/power ratio of the lead vehicle A in order to predict a slowdown, which would decrease the driving distance between the two vehicles. Another one would be to monitor the road ahead of the lead vehicle A in order to observe any queue formation, which again would imply a slowdown of the lead vehicle A.

The present invention is not limited to the embodiments disclosed and described above. Rather, a number of alterations to the invention may be made without deferring from the scope as defined by the claims. Such alterations may include the use of external means for monitoring an intended drive ahead of the host vehicle H. In such a case the inventive method and system does not itself monitor the intended drive, but relies upon and retrieves information from this external monitoring system. There are many different positioning systems on the market today, and the functionality of such systems is constantly developed, such that it may be expedient for the manufacturer of the inventive system to purchase such externally and only provide retrieval and any calculation functionality within the inventive method and system.

The invention claimed is:

1. A method for controlling a driving distance between a host vehicle and as first vehicle driving in front of the host vehicle, the host vehicle driving at a driving speed and at the driving distance to the first vehicle, the host vehicle comprising:
   a system for controlling the driving distance, which is adapted to retain the driving distance at not less than a minimum safety distance: and
   a fuel saving system, which includes an automatic speed increasing function, which automatic speed increasing function, upon fulfilment of a set of conditions, is activated to automatically increase the driving speed in order to utilise the kinetic energy inherent in the host vehicle to save fuel,
   the method comprising the steps of:
   retrieving information to prepare for activation of the automatic speed increasing function;
   preparing for the activation by
      setting the minimum safety distance to a first distance, whereby, when the driving distance is less than the first distance, the system for controlling the driving distance will adapt the driving speed until the first safety distance is reached;
   allowing activation of the automatic speed increasing function only when the driving distance is at least the first distance, and upon retrieval of information that the set of conditions is fulfilled;
   and, upon activation of the automatic speed increasing function, setting the minimum safety distance to a second distance, the second distance being shorter than the first distance such that the difference between the second and the first distances is available during the activity of the speed increasing function to perform an automatic speed increase without conflict with the system for controlling a driving distance,
   wherein the host vehicle comprises freewheeling means, by means of which a propulsion unit is disconnectable from driving wheels of the host vehicle, and wherein the step of activating the automatic speed increasing function includes launching of the freewheeling means.

2. A method according to claim 1, wherein the activation of the fuel saving system is selectable, preferably by a driver initiated activation.

3. A method according to claim 1, wherein information to prepare for activation of the automatic speed increasing function is always retrieved when the fuel saving system is active.

4. A method according to claim 1, wherein the information to prepare for activation of the automatic speed increasing function is retrieved only when the fuel saving system is active and the set of conditions is fulfilled.

5. A method according to claim 1, wherein the system for controlling the driving distance includes a pre-set minimum safety distance, and the first distance is set by adding an offset distance to the pre-set minimum safety distance.

6. A method according to claim 5, wherein the second distance is equal to the preset minimum safety distance, such that the offset distance is available during the activity of the speed increasing function.

7. A method according to claim 1, in which the system for controlling the driving distance includes a pre-set minimum safety distance, and the first distance is equal to the pre-set minimum safety distance.

8. A method according to claim 1, in which the difference between the second distance and the first distance is dependent on the driving speed.

9. A method according to claim 1, wherein the host vehicle further comprises an active cruise control system, whereby the method further comprises:
   driving at the driving speed under control by the active cruise control system.

10. A method according to claim 1, wherein the step of retrieving information that the set of conditions is fulfilled includes:
   monitoring whether the set of conditions is or is about to be fulfilled, and/or communicating information that the set of conditions is or is about to be fulfilled.

11. A method according to claim 10, wherein the step of monitoring whether the set of conditions is about to be fulfilled includes:
   monitoring a topography of an intended drive ahead of the host vehicle; and
   determining whether the set of conditions will be fulfilled along the monitored intended drive.

12. A method according to claim 11, wherein the step of adapting the driving speed until the first distance is reached includes:
   monitoring a topography of an intended drive ahead of the host vehicle; and
   selecting a position along the monitored intended drive for the step of adapting the driving speed until the first safety distance is reached, in which position a favourable fuel consumption for the host vehicle is achieved.

13. A method according to claim 11, wherein the step of monitoring whether the set of conditions is fulfilled includes:
   monitoring a topography of an intended drive ahead of the host vehicle; and
   evaluating whether the intended drive includes an uphill slope fulfilling the set of conditions such that the automatic speed increasing function is enabled for increasing the vehicle speed in advance of the uphill slope.

14. A method according to claim 11, in which the step of monitoring a topography of an intended drive ahead of the host vehicle includes using a Global Positioning System (GPS).

15. A method according to claim 1, wherein the step of monitoring the set of conditions includes:
   monitoring a topography of an intended drive ahead of the host vehicle (H) by the aid of a Global Positioning System (GPS); and
   calculating along the intended drive whether the set of conditions is fulfilled.

16. A method according to claim 1, wherein the step of adapting the driving speed until the first distance is reached and/or the step of monitoring whether the set of conditions is fulfilled includes assessing a near future behaviour of the first vehicle.

17. A method in accordance with claim 11, wherein the monitoring of a topography of an intended drive and/or the assessment of a near future behaviour of the first vehicle is used as input for selecting the difference between the second and the first distances, so as to adapt the difference to an estimated upcoming situation.

18. A method according to claim 1, wherein the step of adapting the driving speed until the first distance is reached includes automatically reducing power output to the driving wheels.

19. A system arranged in a host vehicle for controlling a driving distance between the host vehicle and a first vehicle driving in front of the host vehicle, the host vehicle driving at a driving speed and at the driving distance to the first vehicle, the host vehicle comprising:
   a system for controlling the driving distance, which is adapted to retain the driving distance at not less than a minimum safety distance; and
   a fuel saving system, which includes an automatic speed increasing function, which automatic speed increasing function, upon fulfilment of a set of conditions, is activated to automatically increase the driving speed in order to utilise the kinetic energy inherent in the host vehicle to save fuel,
   the system performing the steps of:
   retrieving information to prepare for activation of the automatic speed increasing function;
   preparing for the activation by
      setting the minimum safety distance to a first distance, whereby, when the driving distance is less than the first distance, the system for controlling the driving distance will adapt the driving speed until the first safety distance is reached;
      allowing activation of the automatic speed increasing function only when the driving distance is at least the first distance, and upon retrieval of information that the set of conditions is fulfilled;
      and, upon activation of the automatic speed increasing function, setting the minimum safety distance to a second distance, the second distance being shorter than the first distance, such that the difference between the second and the first distances is available during the activity of the speed increasing function to perform an automatic speed increase without conflict with the system for controlling a driving distance,
   wherein the host vehicle comprises freewheeling means, by means of which a propulsion unit is disconnectable from driving wheels of the host vehicle, and wherein activation of the automatic speed increasing function includes launching of the freewheeling means.

* * * * *